United States Patent [19]
Miwa et al.

[11] Patent Number: 6,097,505
[45] Date of Patent: Aug. 1, 2000

[54] COMMUNICATION APPARATUS AND COMMUNICATION CONTROL METHOD

[75] Inventors: Tetsuji Miwa, Takatsuki; Masahiro Takatori, Toyonaka; Shigeru Kamata, Nagaokakyo; Fuyuki Abe, Nara; Satoshi Matsuura, Osaka; Hidemi Henmi, Otsu, all of Japan

[73] Assignee: Matsushita Electric Industrial Co., Ltd., Osaka, Japan

[21] Appl. No.: 09/044,844

[22] Filed: Mar. 20, 1998

[30] Foreign Application Priority Data

Mar. 21, 1997 [JP] Japan .................................. 9-067663
Apr. 30, 1997 [JP] Japan .................................. 9-112203
Jul. 31, 1997 [JP] Japan .................................. 9-205652

[51] Int. Cl.$^7$ .............................. H04N 1/00; H04N 1/32
[52] U.S. Cl. ...................... 358/434; 358/468; 379/100.01
[58] Field of Search .................... 358/442, 434, 358/440, 400, 401, 407, 468, 444, 435, 436, 437, 438, 439, 406, 446; 379/100.01, 100.05, 100.06, 100.09, 100.14, 100.15

[56] References Cited

U.S. PATENT DOCUMENTS

| | | | |
|---|---|---|---|
| 4,930,017 | 5/1990 | Izawa | 358/468 |
| 4,964,154 | 10/1990 | Shimotomo | 358/442 |
| 4,991,200 | 2/1991 | Lin | 379/100 |
| 5,475,500 | 12/1995 | Takeda | 358/468 |
| 5,528,385 | 6/1996 | Manning | 358/468 |
| 5,530,558 | 6/1996 | Nachman | 358/442 |
| 5,751,442 | 5/1998 | Hamada et al. | 358/442 |

FOREIGN PATENT DOCUMENTS 61-251248  8/1986  Japan .

*Primary Examiner*—Madeleine Nguyen
*Attorney, Agent, or Firm*—McDermott, Will & Emery

[57] ABSTRACT

The invention comprises modulating means for modulating digital data of fax format into analog signal and transmitting, a fax apparatus connected directly to the modulating means without resort to telephone circuit, DC feed means for feeding direct current to the fax apparatus, and call signal generating means for generating and sending out a call signal to the fax apparatus, in which a call signal is sent out from the call signal generating means, and the output of the modulating means is sent out to the fax apparatus without passing through telephone circuit, so that the fax apparatus connected directly to the modulating means can automatically receive data from the modulating means such as modem. As a result, image data such as bit map data can be easily transmitted directly to the fax apparatus and printed out, and the user can use the fax apparatus easily as a handy printer.

5 Claims, 13 Drawing Sheets

COMMUNICATION APPARATUS AND COMMUNICATION CONTROL METHOD

FIELD OF THE INVENTION

The present invention is intended to facilitate input and output of various data in a facsimile (fax) apparatus, and relates to, for example, a modulator-demodulator (modem) for modulating and demodulating fax data into analog signal for transmitting and receiving through a telephone circuit, or a communication apparatus, computer, intelligent television or the like for converting image data such as bit map data into fax data and printing by using a fax apparatus, or receiving fax data from fax apparatus and displaying by converting into image data such as bit map data.

BACKGROUND OF THE INVENTION

Recently, the so-called multimedia trend in the electric household appliances and computer apparatus has been promoted, and devices for transmitting and receiving image data have come to be used widely.

A conventional communication apparatus is described below. FIG. 12 and FIG. 13 show a constitution of a conventional communication apparatus.

Reference numeral 101 denotes an image memory, in which image data is developed as bit map data and recorded. Reference numeral 102 denotes a display circuit, which reads out the bit map data on the image memory 101, and converts and issues as display RGB signal. Reference numeral 103 is a microcomputer, which reads out bit map data, and converts into a fax format. Reference numeral 104 denotes a fax modem, which receives fax digital data converted by the microcomputer 103, modulates into an analog signal to be transmitted through a telephone circuit, and transmits to the telephone circuit through an NCU circuit 105. Reference numeral 106 denotes a fax apparatus, which is directly connected to the telephone circuit, and is used only for transmission and reception through the telephone circuit.

Referring to FIG. 13, the control actin of the NCU circuit 105 in FIG. 12 is described below. Reference numeral 111 is a fax modem, which is controlled by a microcomputer 112.

When the fax modem 111 transmits fax data to the telephone circuit, the microcomputer 112 confirms that a fax apparatus 114 is not in off-hook state by an off-hook detecting circuit 115 connected to the fax apparatus 114, and changes over a changeover circuit 110 to the fax modem side by the control of the microcomputer 112, sets an off-hook switch 113 connected to the fax modem 111 to an off-hook state, and then controls to transmit data to the telephone circuit.

When receiving fax data from the telephone circuit, on the other hand, a transmitted call signal is detected by a ring detecting circuit 116 connected to the telephone circuit, and when the fax apparatus 114 is not in off-hook state, the changeover circuit 110 is changed over to the fax modem side by the control of the microcomputer 112, and the fax modem 111 hooks off the off-hook switch 113 by the control of the microcomputer 112. At this time, by a current source 117, a DC loop is formed in the telephone circuit, and an off-hook state is set up. Then the fax modem 111 receives the fax data.

The fax apparatus 114 is connected to the telephone circuit through a changeover circuit 110, and to transmit and receive a call signal with the telephone circuit, only after the changeover circuit 110 is changed over to the fax apparatus 114 side by the control by the microcomputer, transmission or reception of fax data with the telephone circuit is realized. However, since the fax modem 111 and fax apparatus 114 cannot be connected by the changeover circuit 110, transmission and reception between the fax modem 111 and fax apparatus 114 are disabled. Although not shown in the diagram, if the fax apparatus 114 is directly connected to the fax modem 111 without connecting through the telephone circuit, the fax modem 111 has no transmitting and receiving means of call signal with the fax apparatus 114 without communicating through the circuit, and therefore fax data cannot be transmitted or received automatically by the control of the microcomputer 112 between the fax modem 111 and fax apparatus 114.

In FIG. 13, incidentally, the bridge circuit and others necessary for the NCU circuit are omitted because they are not directly related to the description of the present invention.

Thus, in this constitution, the following problems are known.

(1) Since the NCU circuit 118 cannot send out a call signal to the fax apparatus 114 connected directly to the fax modem 111 without connecting through the telephone circuit, the fax apparatus 114 cannot control the NCU circuit 118 to hook off by receiving the call signal. As a result, data cannot be transmitted to the fax apparatus 114 connected directly without connecting through the telephone circuit.

(2) Since the NCU circuit 118 has no means for selecting the destination of transmission data whether the telephone circuit 119 or fax apparatus 114, the user cannot select the destination of the transmission data.

(3) Since the fax modem 111 cannot detect the call signal from the fax apparatus 114 connected directly to the fax modem 111 without connecting through the telephone circuit, the microcomputer 112 cannot control the fax apparatus 114 to hook off. As a result, data cannot be received from the fax apparatus 114 connected directly without connecting through the telephone circuit.

(4) Since the NCU circuit has no function for selecting the sender of reception data whether the telephone circuit 119 or fax apparatus 114, the user cannot select the sender of the reception data.

SUMMARY OF THE INVENTION

The invention relates to a communication apparatus and communication control method comprising modulating means modulating digital data of fax format into analog signal and transmitting, fax apparatus connected to this modulating means, DC supply means for feeding direct current to this fax apparatus, and call signal generating means for generating and sending out a call signal to this fax apparatus, in which the output of the modulating means is sent out to the fax apparatus without connecting through telephone circuit after the call signal is sent out by the call signal generating means. Therefore, the data can be sent to the fax apparatus by the modulating means, and the fax apparatus can receive this data.

The invention, in this communication apparatus, also relates to a communication apparatus and communication control method comprising off-hook detecting means, in which a call signal is sent out from the call signal generating means to the fax apparatus after confirming that the fax apparatus is not in off-hook state, and, after the fax apparatus is set off the hook, the fax data is transmitted from the modulating means to the fax apparatus. As a result, the data can be transmitted from the modulating means to the fax apparatus more securely.

DESCRIPTION OF THE PREFERRED EMBODIMENTS

Embodiment 1

An embodiment of the invention is described below while referring to the accompanying drawings.

Figure 1:
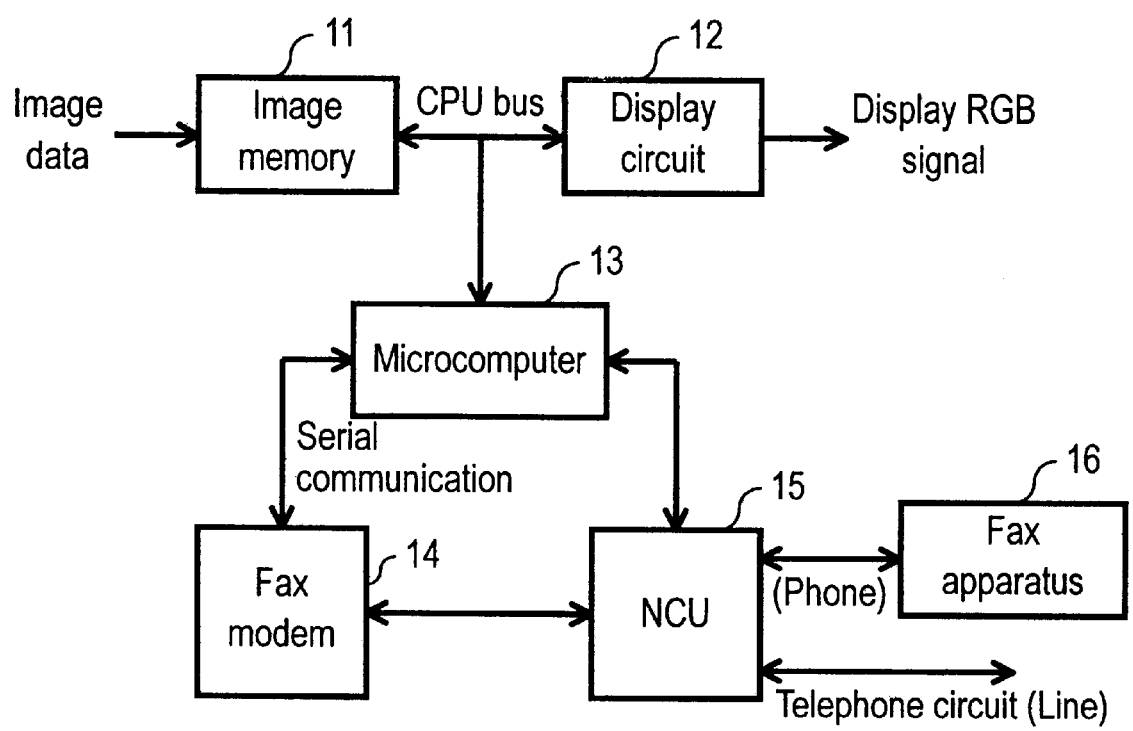
FIG. 1 is a block diagram showing a structural example of a communication apparatus of the invention.

FIG. 1 is a diagram showing a constitution of a communication apparatus of the invention. In FIG. 1, reference numeral 11 is an image memory, which records entered image data as bit map data. Reference numeral 12 is a display circuit, which reads out bit map data on the image memory 11, and issues by converting into display RGB signal. Reference numeral 13 is a microcomputer, which reads out bit map data on the image memory 11, and converts into fax format, or converts the entered fax format data into bit map data and writes into the image memory 11. Reference numeral 14 is a fax modem, which receives digital data of fax format converted by the microcomputer 13, modulates into analog signal to be transmitted to telephone circuit, and transmits to a fax apparatus 16 or telephone circuit through an NCU circuit 15. The fax modem 14 also receives fax data modulated into analog signal from the fax apparatus 16 or telephone circuit, and converts into digital data format of fax format, and issues to the microcomputer 13.

In the invention, the fax modem and fax apparatus 16 are directly connected, which was impossible in the prior art, that is, without using telephone circuit, the fax modem 14 and fax apparatus 16 are directly connected, and mutual transmission and reception are possible. A structural example of the NCU circuit is shown below, and its operation is described.

Figure 2:
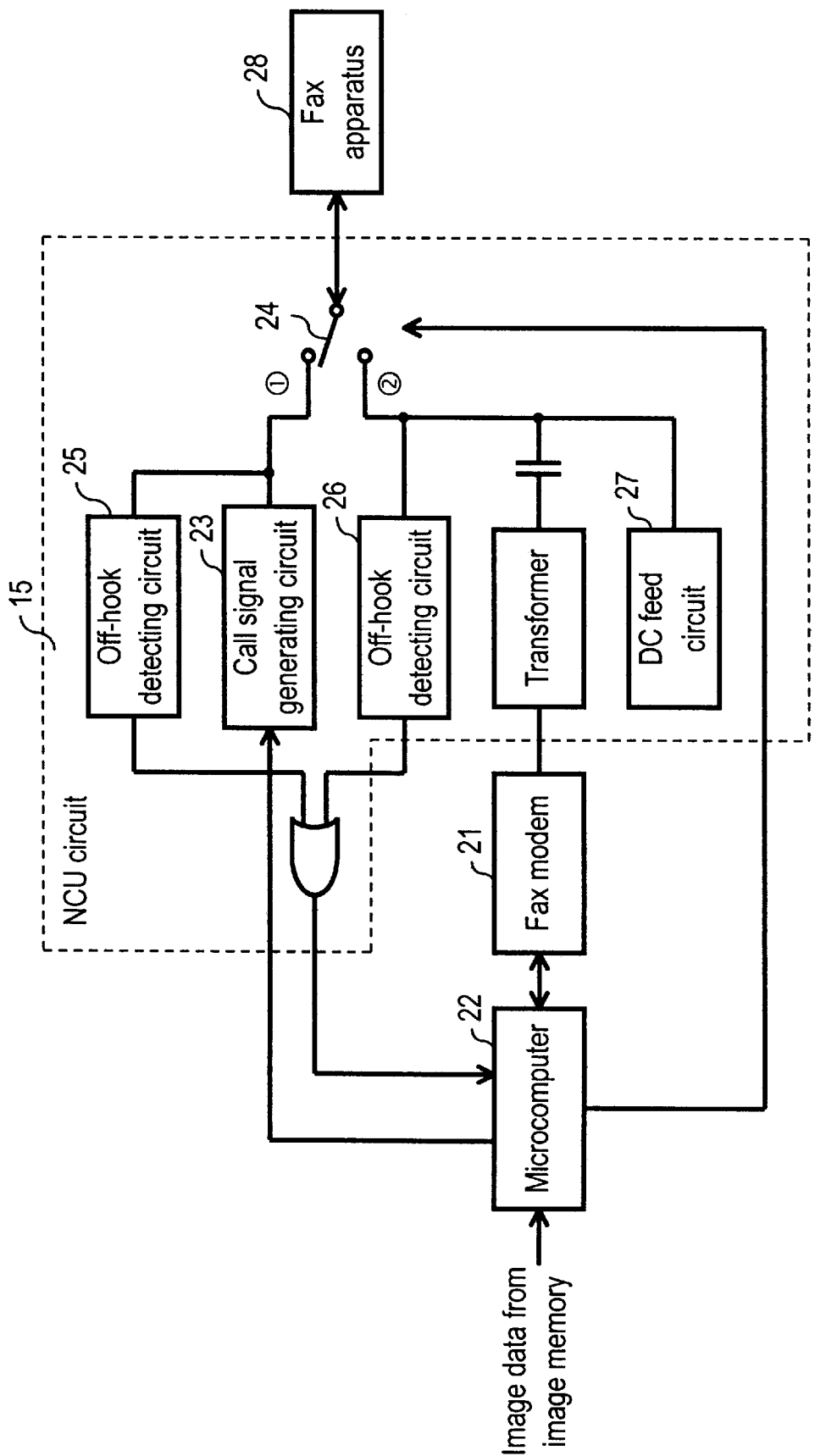
FIG. 2 is a block diagram showing a constitution of an NCU circuit in a first embodiment of the invention.

In FIG. 2, reference numeral 21 is a fax modem, which is controlled by a microcomputer 22, and receives digital data of fax format, and modulates and issues as analog signal. Reference numeral 23 is a call signal generating circuit, which receives a call signal in a period of ON for 1 second and OFF for 2 seconds at 16 Hz from the microcomputer 22, and converts and issues at an amplitude of about 200 V. Reference numeral 24 is a changeover circuit, which changes over connection source of a fax apparatus 28 to either fax modem 21 or call signal generating circuit 23 by the control of the microcomputer 22. Reference numeral 25 is a first off-hook detecting circuit, which connects to the fax apparatus 28 when the changeover circuit 24 is changed over to the call signal generating circuit 23 side. Reference numeral 26 is a second off-hook detecting circuit, which connects to the fax apparatus 28 when the changeover circuit 24 is changed over to the fax modem 21 side. Reference numeral 27 is a DC supply circuit or a current source, which feed DC current to the fax apparatus 28 through the changeover circuit 24.

Figure 3:
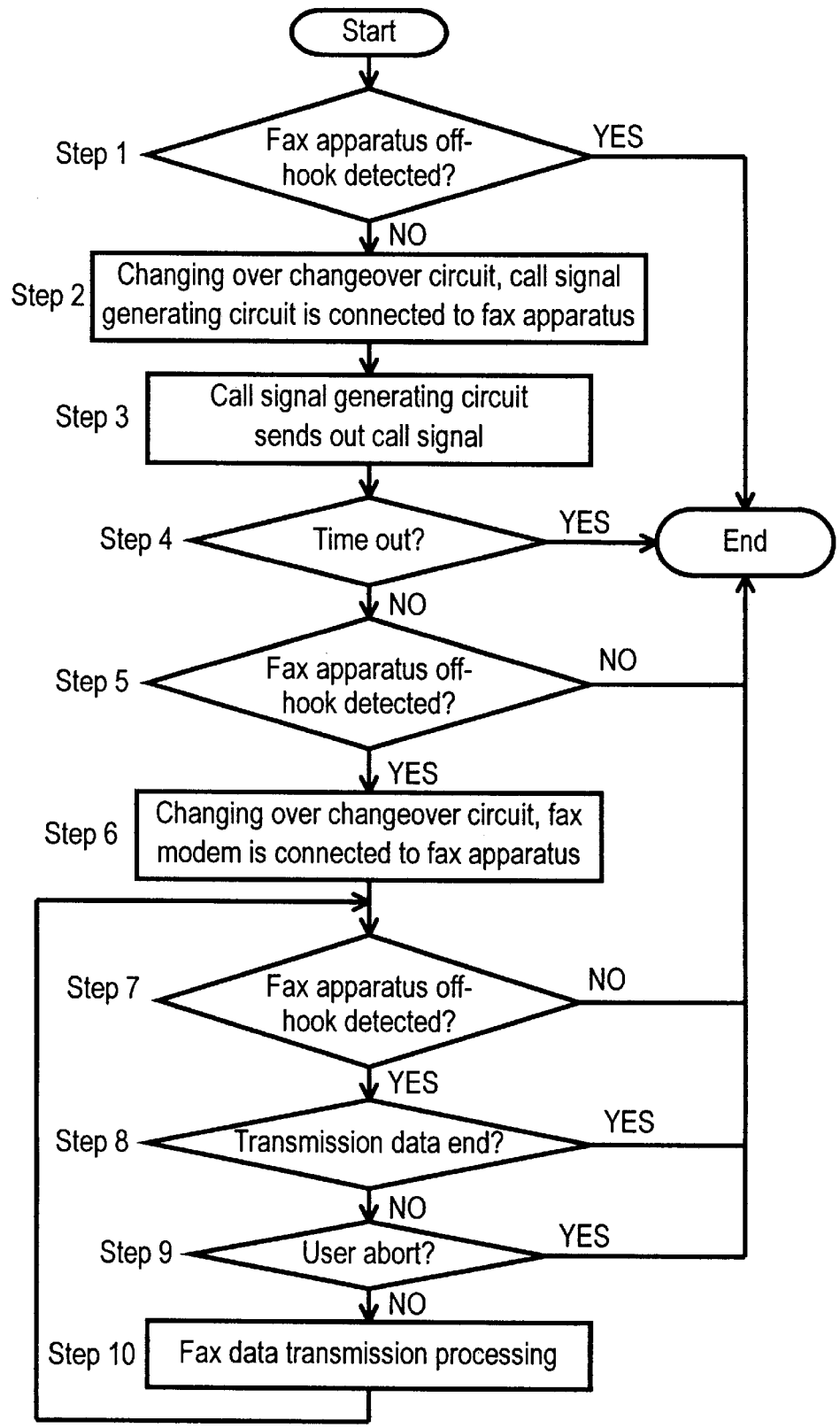
FIG. 3 is a flowchart of control action of the NCU circuit.

In thus constituted communication apparatus, the control operation of the microcomputer 22 and others when the user transmits fax data to the fax apparatus 28 is described while referring to FIG. 2 and FIG. 3.

In FIG. 3, first depending on the corresponding second off-hook detecting circuit 26 or first off-hook detecting circuit 25, it is confirmed that the fax apparatus 28 is not in off-hook state (step 1), and the changeover circuit 24 is changed over to the call signal generating circuit 23 side (step 2). Afterwards, the call signal generating circuit 23 sends out a call signal to the fax apparatus 28 (step 3). Then, within a specified time, the off-hook state of the fax apparatus 28 is confirmed by the corresponding off-hook detector circuit 23 (step 5), and the changeover circuit 24 changes over to the fax modem 21 side (step 6). The fax modem 21 controls to transmit the data from the image memory 11 shown in FIG. 1 as fax format data (step 10). By executing such action, the entered image data can be issued from the fax apparatus 28 connected directly without connecting through the telephone circuit.

Incidentally, when the corresponding second off-hook detecting circuit 26 confirms that the fax apparatus 28 is not in off-hook state (step 7), or when sending of transmission data is over (step 8), or when the user has stopped transmission (step 9), the microcomputer 22 controls to stop the transmission.

In FIG. 2, meanwhile, the bridge circuit and others necessary for the NCU circuit 15 are not directly related with the description of the invention and are hence omitted.

In the communication apparatus thus constituted, the NCU circuit 15 comprises means for transmitting a call signal to the fax apparatus 28 connected directly without using telephone circuit, and the fax apparatus 28 receives the call signal, and controls the NCU circuit 15 to hook off.

That is, the call signal can be sent out because the NCU circuit 15 has the call signal generating function to the fax apparatus 28 connected directly without resort to telephone circuit. As a result, the fax apparatus 28 can be controlled off the hook, and the directly connected fax apparatus 28 can receive data automatically. Hence, image data such as bit map data can be easily transmitted directly and printed in the fax apparatus. Therefore, the user can easily utilize the fax apparatus as a handy printer.

Embodiment 2

A second embodiment of the communication apparatus of the invention is described below while referring to the drawings.

Figure 4:
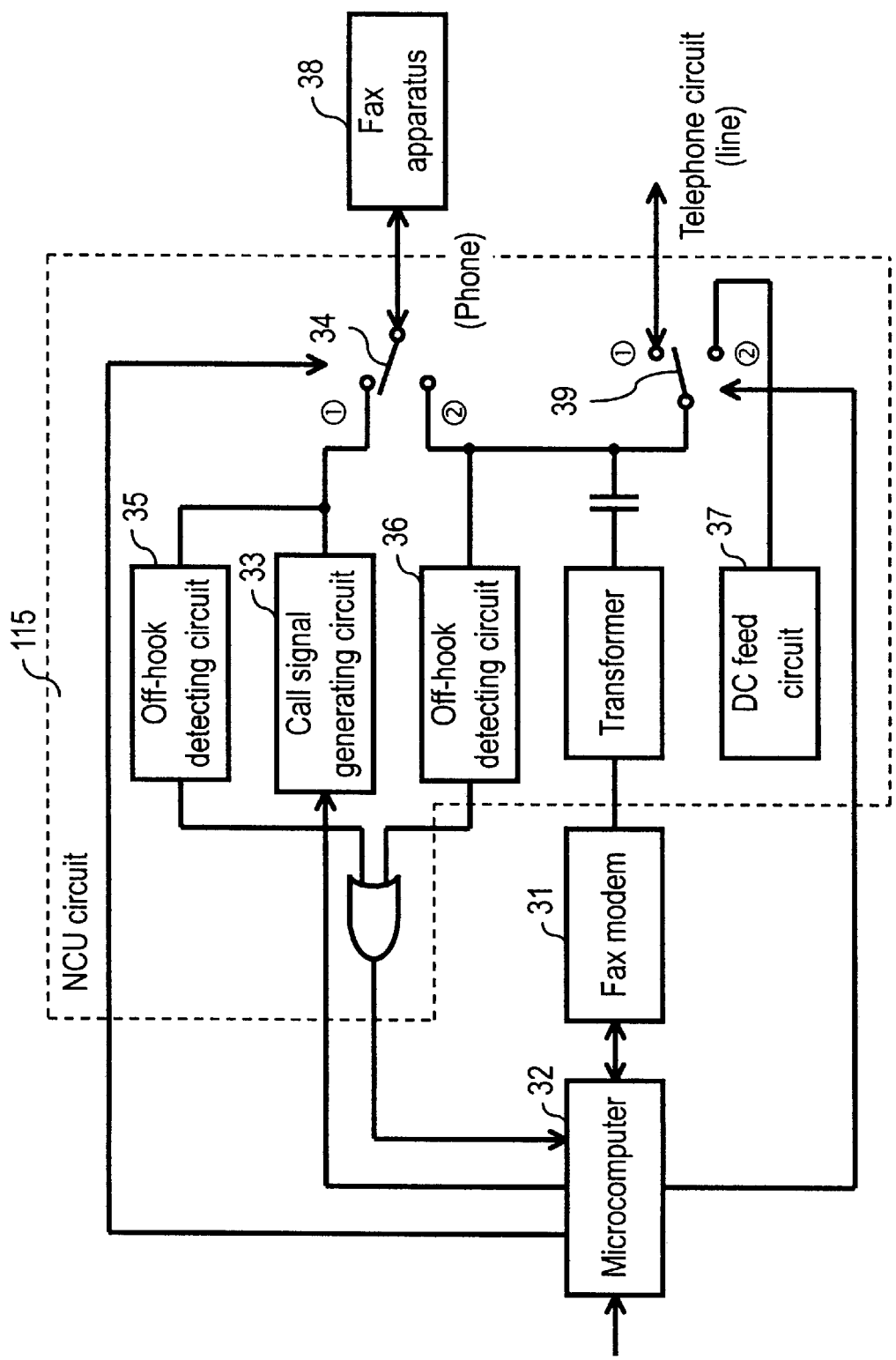
FIG. 4 is a block diagram showing a constitution of an NCU circuit in a second embodiment of the invention.

In FIG. 4, reference numeral 31 is a fax modem, which is controlled by a microcomputer 32, and receives digital data of fax and modulates and issues as analog signal. Reference numeral 33 is a call signal generating circuit, which receives a call signal in a period of ON for 1 second and OFF for 2 second at 16 Hz, and converts into an amplitude to about 200 V and issues. Reference numeral 34 is a first changeover circuit, which changes over the connection source of a fax apparatus 38 to the fax modem 31 or call signal generating circuit 33 by the control of the microcomputer 32. Reference numeral 35 is a first off-hook detecting circuit, which is connected to the fax apparatus 38 when the first changeover circuit 34 is connected to the call signal generating circuit 33 side, and detects off-hook state.

Reference numeral 36 is a second off-hook detecting circuit, which is connected to the fax apparatus 38 when the first changeover circuit 34 is connected to the fax modem 31 side, and detects off-hook state. Reference numeral 37 is a DC supply circuit or a current source, which supplies DC current to the fax apparatus 38 through the first changeover circuit 34 and second changeover circuit 39 described next. Reference numeral 39 is a second changeover circuit, which changes over the connection destination of the fax modem 31 to the telephone circuit or DC supply circuit 37 by the control of the microcomputer 32.

When transmitting fax format data from the fax modem 31 to the fax apparatus 38 and delivering from the fax apparatus 38, as in the control shown in the flowchart in FIG. 3, the microcomputer 32 confirms that the fax apparatus 38 is not in off-hook state by the corresponding second off-hook detecting circuit 36 or first off-hook detecting circuit 35 (step 1), and the first changeover circuit 34 is changed over to the call signal generating circuit 33 side, and the second changeover circuit 39 is changed over to the DC supply circuit 37 side (step 2). Consequently, the call signal generating circuit 33 sends out a call signal to the fax apparatus 38 (step 3). When the fax apparatus 38 is set off the hook within a specified time, it is detected by the off-hook detecting circuit 35 (step 5), and the first changeover circuit 34 is changed over to the fax modem 31 side (step 6). At this time, direct current is supplied from the DC supply circuit 37 into the fax apparatus 38. Then, the fax modem 31 controls to transmit the fax data from the image memory 11 into the fax apparatus 38 (step 10).

The corresponding off-hook detecting means 36 or off-hook detecting circuit 35 controls to stop the transmission when detecting that the fax apparatus 38 is not in off-hook state (step 7), when sending of transmission data is terminated (step 8), or when the user has stopped transmission (step 9).

Referring next to the flowchart in FIG. 5 and FIG. 4, the control of transmission of fax format data from the fax modem 31 to the telephone circuit is described below.

By the corresponding second off-hook detecting circuit 36, the microcomputer 32 confirms that the fax apparatus 38 is not in off-hook state (step 11), and the first changeover circuit 34 is changed over to the call signal generating circuit 33 side. Also at this time, the second changeover circuit 39 is changed over to the telephone circuit side (step 12).

Consequently, using the second off-hook detecting circuit 36, the microcomputer 32 confirms that the telephone circuit is not in off-hook state (step 13), and the fax modem 31 sends out a call signal to the telephone circuit (step 14).

Later, making sure the telephone circuit is off the hook (time out) in a specified time (step 15), and it is controlled to transmit the fax data of fax format from the fax modem 31 to the telephone circuit (step 19).

The fax modem 31, when confirming that the telephone circuit is not in off-hook state (step 16), or when transmission of transmission data is over (step 17), or when the user has stopped transmission (step 18), controls to stop the transmission.

When controlling to transmit from the fax apparatus 38 to the telephone circuit, the corresponding second off-hook detecting circuit 36 or first off-hook detecting circuit 35 detects that the fax apparatus 38 is in off-hook state, and the first changeover circuit 34 is changed over to the fax modem 31 side, and the second changeover circuit 39 is changed over to the telephone circuit side. Then, the fax apparatus 38 transmits fax data to the telephone circuit.

In FIG. 4, meanwhile, the bridge circuit and others necessary for the NCU circuit 115 are not directly related with the description of the invention, and are hence omitted.

In thus constituted communication apparatus, in addition to the effects of the constitution explained in embodiment 1, since the NCU circuit 115 has the function of selecting the destination of the transmission data, whether the telephone circuit or the fax apparatus, by the control of the microcomputer, so that the user can select the destination of the transmission data.

As a result, the communication apparatus of wide application allowing the user to select freely the destination of the transmission data is realized.

Embodiment 3

A third embodiment of the invention is described below while referring to the drawings.

Figure 6:
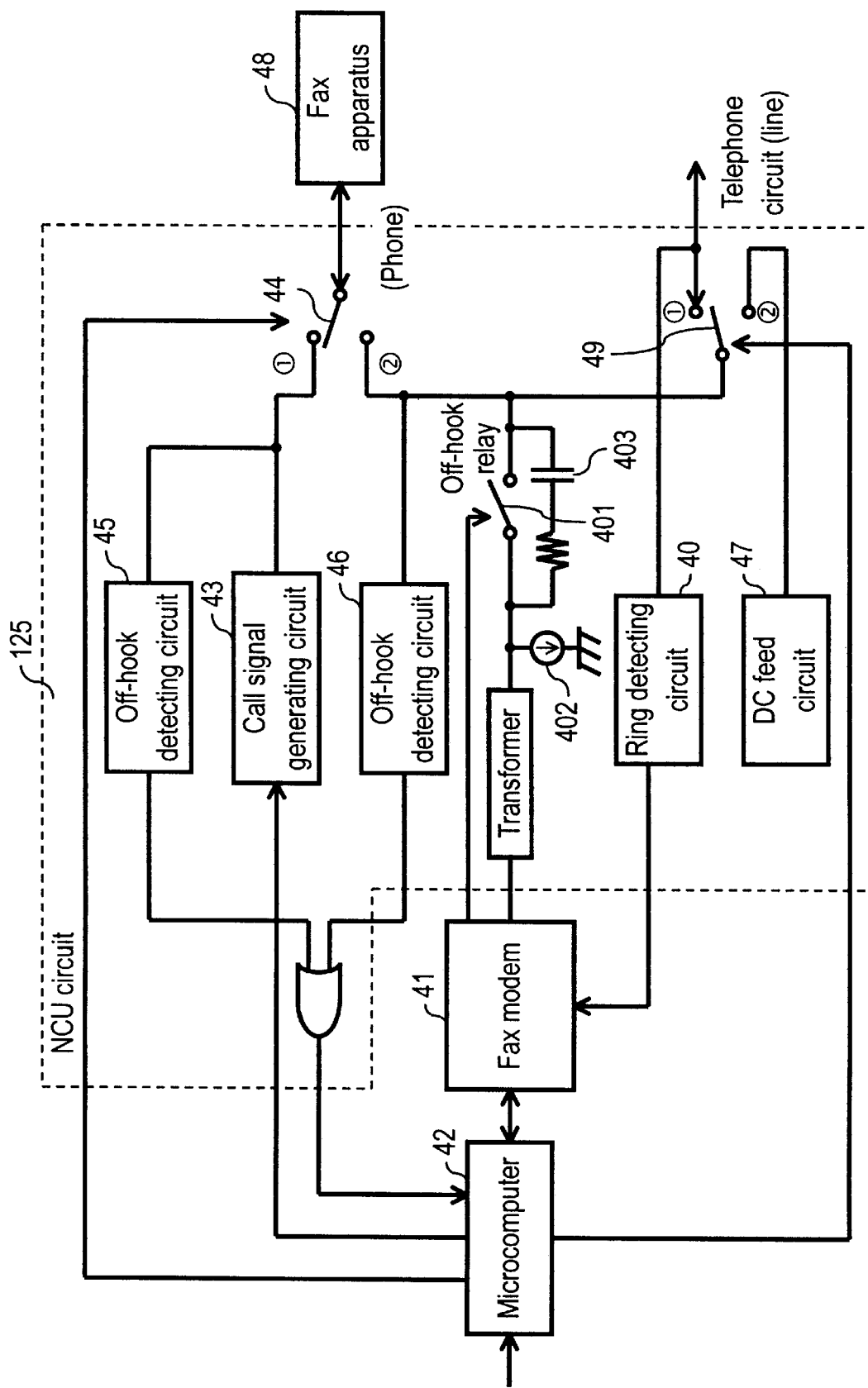
FIG. 6 is a block diagram showing a constitution of an NCU circuit in a third embodiment of the invention.

In FIG. 6, reference numeral 41 denotes a fax modem, which is controlled by a microcomputer 42, and receives fax digital data and modulates and issues as analog signal, and also demodulates the received modulated analog signal into fax digital data. Reference numeral 43 is a call signal generating circuit, which receives a call signal in a period of ON for 1 second and OFF for 2 seconds at 16 Hz from the microcomputer 42, and converts to an amplitude of about 200 V and issues. Reference numeral 44 denotes a first changeover circuit, which changes over the connection source of a fax apparatus 48 whether to the fax modem 41 connected through an off-hook relay 401 or to the call signal generating circuit 43 by control of the microcomputer 42. Reference numeral 45 is a first off-hook detecting circuit, which is connected to the fax apparatus 48 and detects the off-hook state when the first changeover circuit 44 is changed over to the call signal generating circuit 43 side. Reference numeral 46 denotes a second off-hook detecting circuit, which is connected to the fax apparatus 48 and detects the off-hook state when the first changeover circuit 44 is changed over to the off-hook relay 401 side.

Reference numeral 47 denotes a DC feed circuit, which is a current source, and feeds DC current to the fax apparatus 48 through the first changeover circuit 44 and second changeover circuit 49 described next. Reference numeral 49 is a second changeover circuit, which changes over the connection destination of the fax modem 41 whether to the telephone circuit or to the DC feed source 47, through the off-hook relay 401, by the control of the microcomputer 42. Reference numeral 40 is a ring detecting circuit, which is connected to the telephone circuit and judges whether a call signal is transmitted from the telephone circuit or not, and delivers the result to the fax modem 41, and the fax modem 41 delivers the output to the microcomputer 42.

Reference numeral 403 is a capacitor connected at both ends of the off-hook relay for AC coupling. Reference numeral 402 is a current source, which passes current between the fax modem 41 side of the off-hook relay 401 and the grounding point of the telephone circuit to hook off the telephone circuit.

When the user transmits a signal of fax data format from the fax modem 41 to the fax apparatus 48, same as in the control described in the flowchart in FIG. 3, it is confirmed that the fax apparatus 48 is not in off-hook state by the corresponding second off-hook detecting circuit 46 or first off-hook detecting circuit 45 (step 1), and the microcomputer 42 changes over the first changeover circuit 44 to the call signal generating circuit 43 side (step 2). At this time, the second changeover circuit 49 is controlled to be changed over to the DC feed circuit 47 side.

Consequently, the call signal generating circuit 43 sends out a call signal to the fax apparatus 48 (step 3). When the fax apparatus 48 is hooked off within a specified time, it is confirmed by the corresponding first off-hook detecting circuit 45 (step 5), and the first changeover circuit 44 is changed over to the off-hook relay 401 side (step 6). And, the off-hook relay 401 is maintained in the cut-off state.

The fax modem 41 controls to transmit the image data of the image memory 11 to the fax apparatus 48 as fax data (step 10).

Incidentally, the corresponding off-hook detecting means 46, when confirming the fax apparatus 48 is not in off-hook state (step 7), or when terminating the transmission of transmission data (step 8), or when the user has stopped transmission (step 9), controls to stop the transmission.

Figure 7:
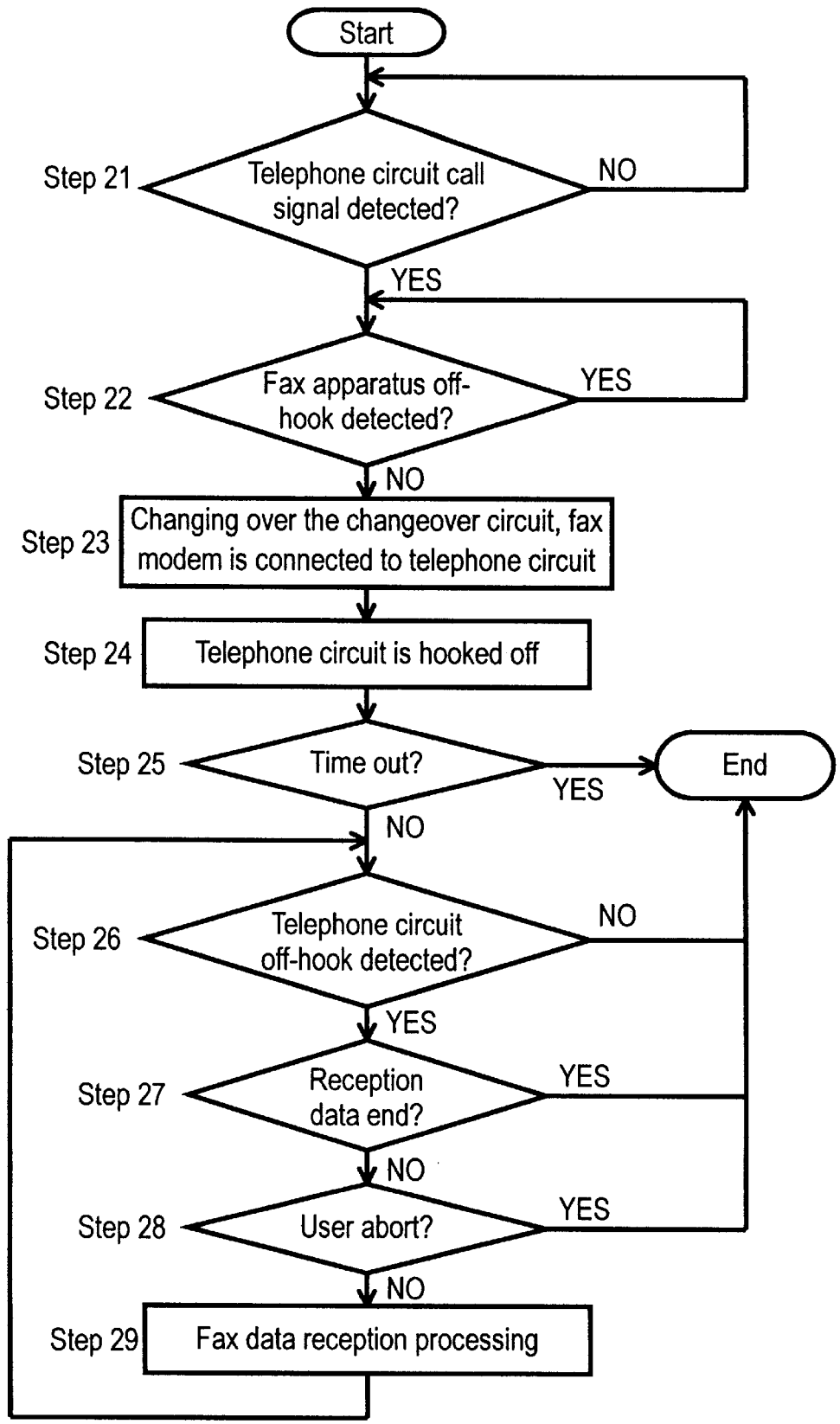
FIG. 7 is a flowchart of control action of the NCU circuit.

When the analog modulated fax data is transmitted from the telephone circuit, the control by the microcomputer 42 when receiving through the fax modem 41 is explained while referring to the flowchart in FIG. 7.

The microcomputer 42 detects the call signal from the telephone circuit by the ring detecting circuit 40 (step 21), and the off-hook state of the fax apparatus 48 is confirmed by the corresponding second off-hook detecting circuit 46 (step 22). When the second off-hook detecting circuit 46 confirms that the fax apparatus 48 is not in off-hook state, the second changeover circuit 49 is changed over to the telephone circuit side (step 23). By conducting the off-hook relay 401, the telephone circuit is hooked off (step 24). Then, the microcomputer 42 controls so that the fax modem 41 may receive the analog modulated fax data from the telephone circuit (step 29).

When the microcomputer 42 confirms that the telephone circuit is not in off-hook state (step 26), when the reception data is over (step 27), or when the user has stopped reception (step 28), it is controlled to stop the reception.

When transmitting from the fax modem 41 to the telephone circuit, or when the user transmits data from the fax apparatus 48 to the telephone circuit, that is, when transmitting the data read into the fax apparatus 48 to outside through the telephone circuit, the operation is achieved by the same control as explained in the second embodiment.

In FIG. 4, the bridge circuit and others necessary for the NCU circuit 125 are not directly related with the description of the invention and are hence omitted.

In thus constituted communication apparatus, in addition to the effects by the constitution shown in the second embodiment, the fax modem can also receive data from the telephone circuit.

And, the communication apparatus of wide application allowing the user to select freely the sender of reception data.

Embodiment 4

A fourth embodiment of communication apparatus of the invention is described below while referring to the drawings.

Figure 8:
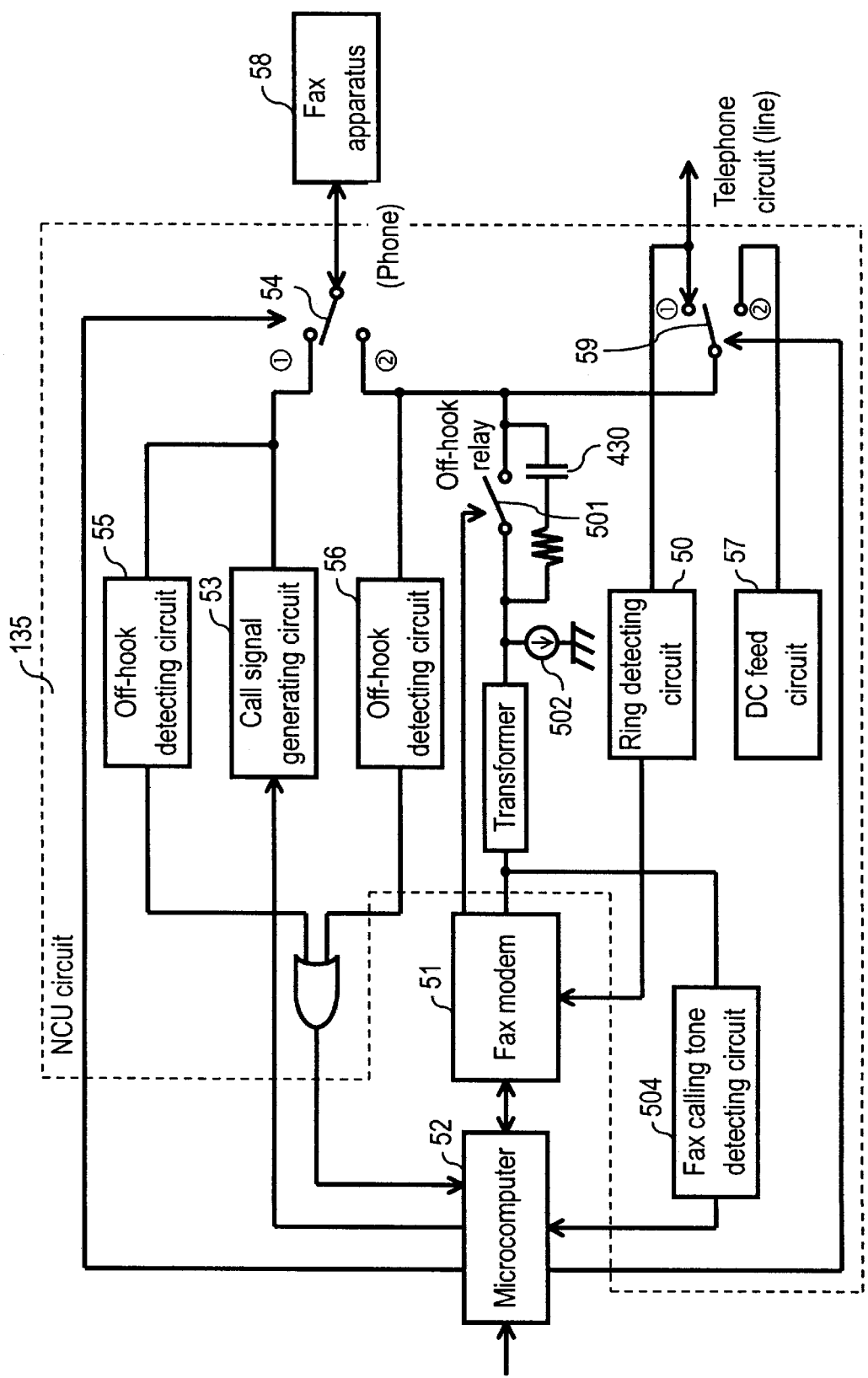
FIG. 8 is a block diagram showing a constitution of an NCU circuit in a fourth embodiment of the invention.

In FIG. 8, reference numeral 51 denotes a fax modem, which is controlled by a microcomputer 52, and receives fax digital data and modulates and issues as analog signal, and also demodulates the received modulated analog signal into fax digital data. Reference numeral 53 is a call signal generating circuit, which receives a call signal in a period of ON for 1 second and OFF for 2 seconds at 16 Hz from the microcomputer 52, and converts to an amplitude of about 200 V and issues. Reference numeral 54 denotes a first changeover circuit, which changes over the connection source of a fax apparatus 58 whether to the fax modem 51 connected through an off-hook relay 501 or to the call signal generating circuit 53 by control of the microcomputer 52.

Reference numeral 55 is a first off-hook detecting circuit, which is connected to the fax apparatus 58 and detects the off-hook state when the first changeover circuit 54 is changed over to the call signal generating circuit 53 side. Reference numeral 56 denotes a second off-hook detecting circuit, which is connected to the fax apparatus 58 and detects the off-hook state when the first changeover circuit 54 is changed over to the off-hook relay 501 side. Reference numeral 57 denotes a DC feed circuit, which is a current source, and feeds DC current to the fax apparatus 58 through the first changeover circuit 54 and second changeover circuit 59 described next. Reference numeral 59 is a second changeover circuit, which changes over the connection destination of the fax modem 51 whether to the telephone circuit or to the DC feed source 57 by the control of the microcomputer 52. Reference numeral 50 is a ring detecting circuit, which is connected to the telephone circuit and judges whether a call signal is transmitted from the telephone circuit or not, and delivers the result.

Reference numeral 503 is a capacitor connected at both ends of the off-hook relay for AC coupling. Reference numeral 502 is a current source, which passes current between the fax modem 51 side of the off-hook relay 501 and the grounding point of the telephone circuit to hook off the telephone circuit. Reference numeral 504 is a fax calling tone detecting circuit, which is connected same as the fax modem 51, and detects the fax calling tone and delivers the result.

Figure 9:
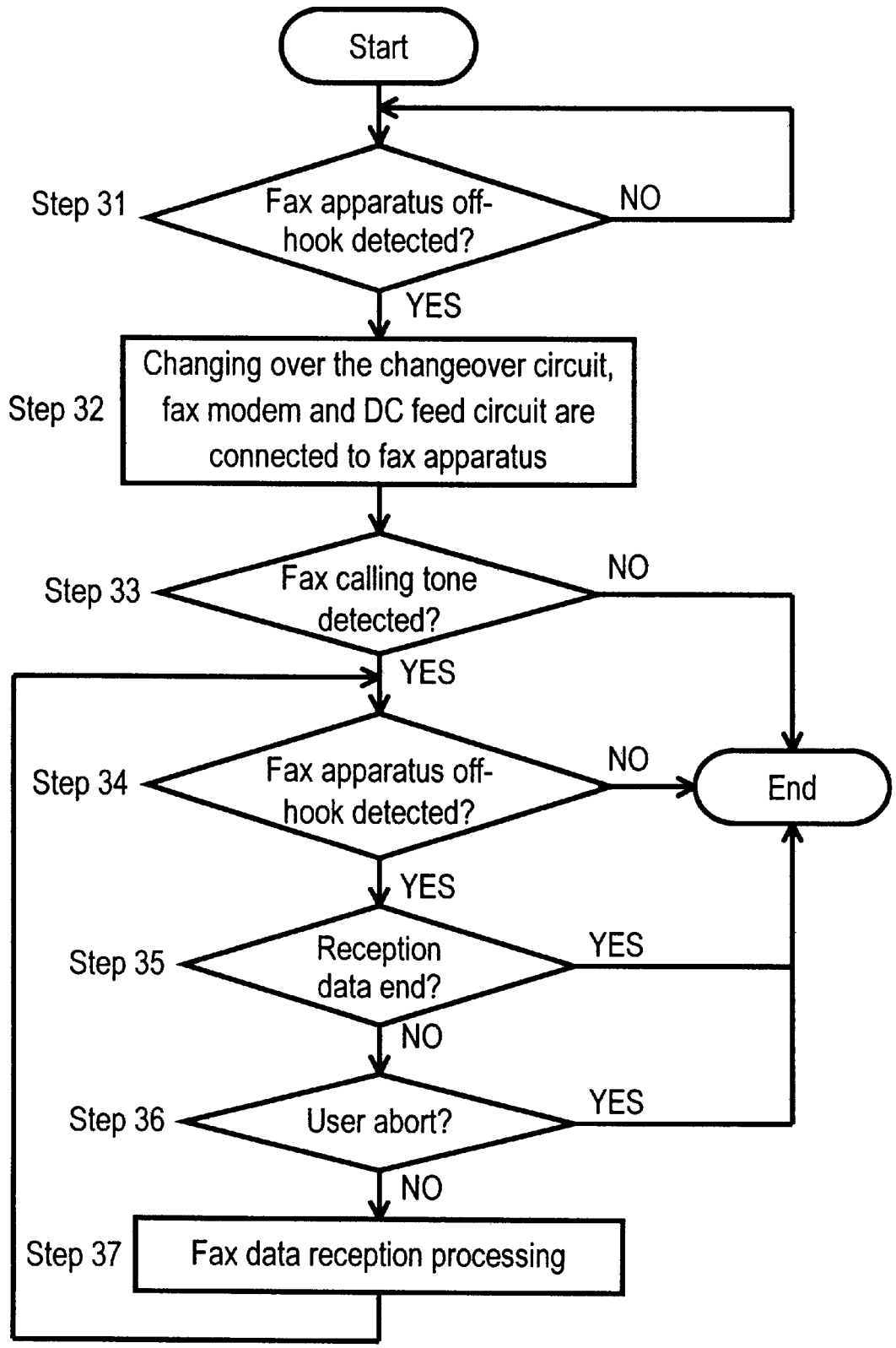
FIG. 9 is a flowchart of control action of the NCU circuit.

The operation control of this constitution is described below. The operation for controlling to transmit the data read into the fax apparatus 58 by the user to the fax modem 51 as fax data is described in the flowchart in FIG. 9.

First, the microcomputer 52 detects the off-hook state of the fax apparatus 58 by using the corresponding second off-hook detecting circuit 56 or first off-hook detecting circuit 55 (step 31). When the fax apparatus 58 is detected to be in off-hook state, the microcomputer 52 controls to change over the first changeover circuit 54 to the off-hook relay 501 side, and similarly to change over the second changeover circuit 59 to the DC feed circuit 57 side, so that the off-hook relay 501 may be kept in cut-off state (step 32).

When the fax apparatus 58 sends out a calling tone, it is confirmed by a fax calling tone judging circuit 504 (step 33). When transmission of calling tone is confirmed, it is controlled so that the analog modulated fax data transmitted by the fax apparatus 58 may be received by the fax modem 51 (step 37).

When transmitting data from the fax modem 51 to the fax apparatus 58, the same control as the control explained in embodiment 3 is effected. The microcomputer 52, when confirming the fax apparatus 58 is not in off-hook state (step 34), or when terminating the reception data (step 35), or when the user has stopped reception (step 36), controls to stop the reception.

When transmitting from the fax modem 41 to the telephone circuit, or when transmitting the data read into the fax apparatus 48 by the user into the telephone circuit, the same control as in the second embodiment is effected.

Figure 5:
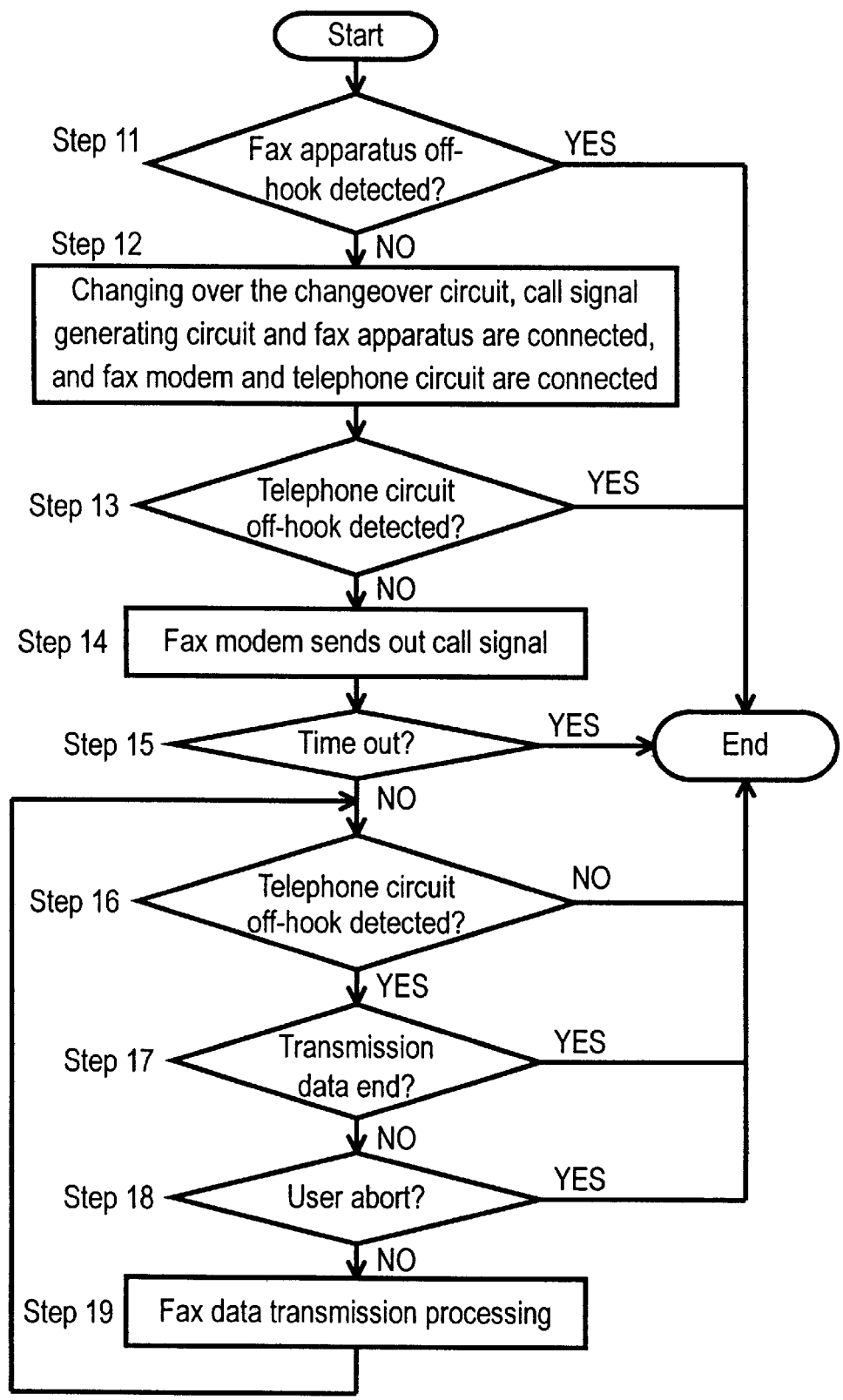
FIG. 5 is a flowchart of control action of the NCU circuit.

In FIG. 5, the bridge circuit and others necessary for the NCU circuit are not directly related with the description of the invention and are hence omitted.

In thus constituted communication apparatus, in addition to the effects by the constitution shown in the second embodiment, it also has the function of detecting the calling tone signal from the fax apparatus 58 connected directly without resort to the telephone circuit, and by the result of this detection, the fax modem 51 hooks off the fax apparatus 58, so that the data from the directly connected fax apparatus 58 can be received by the fax modem 51.

Moreover, the NCU circuit 135 has the function of selecting the sender of the reception data to either telephone circuit or fax apparatus 58, and as a result, the communication apparatus of wide application allowing the user to select freely the sender of reception data.

That is, having the function of detecting the calling tone signal from the fax apparatus connected directly without resort to telephone circuit, or the function of detecting the call signal, the microcomputer is hooked off and starts reception action depending on the result of detection, so that the data can be received automatically from the directly connected fax apparatus. As a result, the information that can be transmitted by the fax apparatus can be received from the directly connected fax apparatus, and is taken in as image data such as bit map data. Therefore, the fax apparatus can be easily used by the user as a scanner.

Embodiment 5

A fifth embodiment of communication apparatus of the invention is described below while referring to the drawings.

Figure 10:
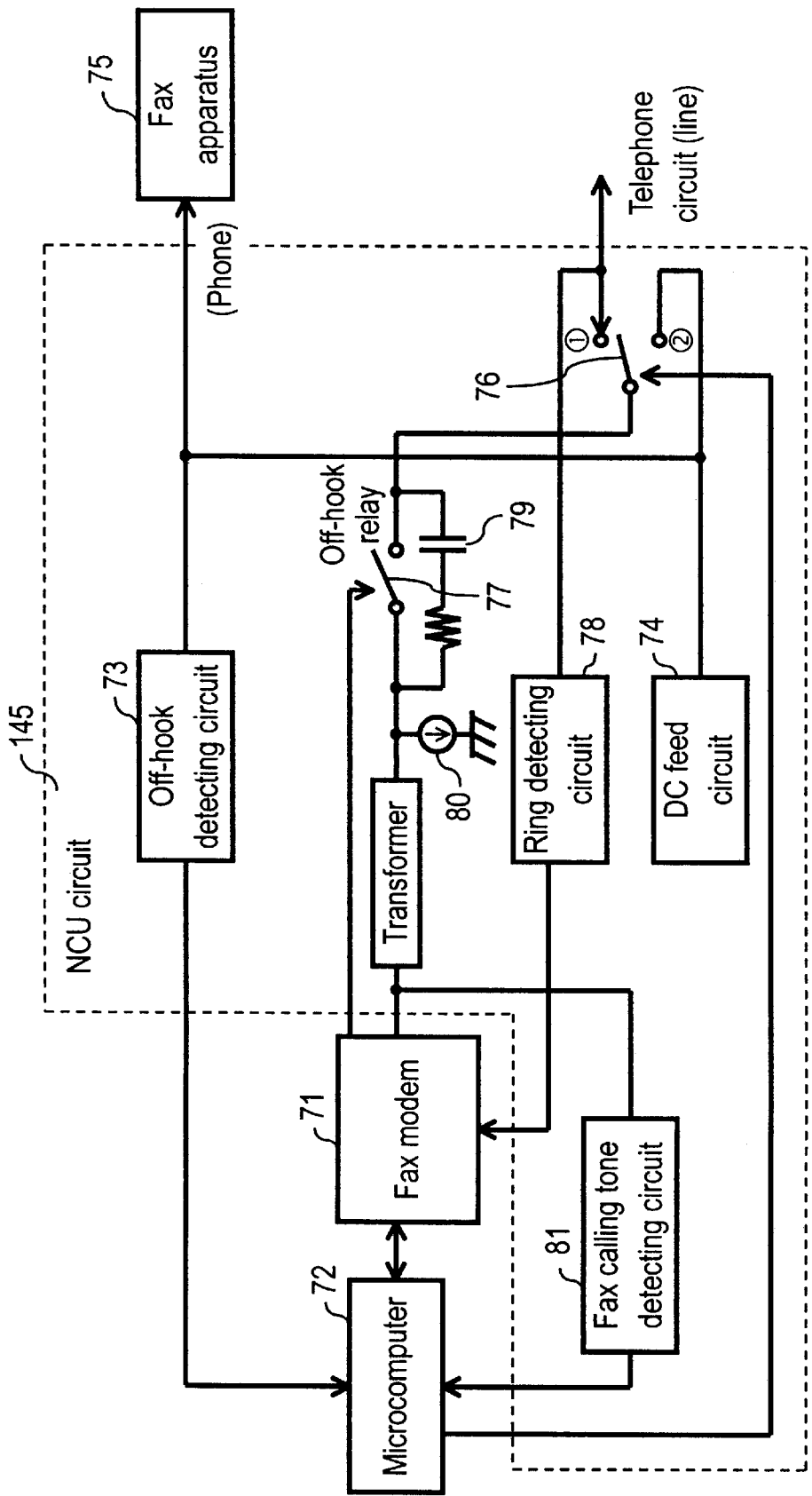
FIG. 10 is a block diagram showing a constitution of an NCU circuit in a fifth embodiment of the invention.

In FIG. 10, reference numeral 71 denotes a fax modem, which is controlled by a microcomputer 72, and demodulates the received modulated analog signal into fax digital data. Reference numeral 73 is an off-hook detecting circuit, which is connected to a fax apparatus 75. Reference numeral 74 denotes a DC feed circuit, which is a current source, and feeds DC current to the fax apparatus 75. Reference numeral 76 is a changeover circuit, which changes over the connection destination of the fax modem 71 through off-hook relay 77 whether to the telephone circuit or to the DC feed source 74 by the control of the microcomputer 72.

Reference numeral 78 is a ring detecting circuit, which is connected to the telephone circuit and judges whether a call signal is transmitted from the telephone circuit or not, and delivers the result to the fax modem 71. Reference numeral 79 is a capacitor connected at both ends of the off-hook relay for AC coupling. Reference numeral 80 is a current source, which passes current between the fax modem 71 side of the off-hook relay 77 and the grounding point of the telephone circuit to hook off the telephone circuit. Reference numeral 81 is a fax calling tone detecting circuit, which is connected same as the fax modem 71, and detects the fax calling tone from the fax apparatus 75 and delivers the result to the microcomputer 72.

The control when transmitting the fax data from the fax apparatus 75 is described below. First, the off-hook detecting circuit 73 detects the off-hook state of the fax apparatus 75. When the fax apparatus 75 is detected to be in off-hook state by the off-hook detecting circuit 73, the changeover circuit 76 is changed over to the DC feed circuit 74 side. At this time, the off-hook relay 77 maintains the cut-off state.

When the fax apparatus 75 sends out a calling tone, it is confirmed by the fax calling tone detecting circuit 81, and it is controlled so that the analog modulated fax data transmitted by the fax apparatus 75 may be received by the fax modem 71.

On the other hand, when analog modulated fax data is transmitted from the telephone circuit, the call signal from the telephone circuit is detected by the ring detecting circuit 78, the changeover circuit 76 is changed over to the telephone circuit side, the off-hook relay 77 is made to conduct, the telephone circuit is hooked off, and it is controlled so that the fax modem 71 can receive the analog modulated fax data from the telephone circuit.

In FIG. 10, the bridge circuit and others necessary for the NCU circuit 145 are not directly related with the description of the invention and are hence omitted.

In thus constituted communication apparatus, in addition to the effects of the foregoing embodiments, the NCU circuit also has the function of selecting the sender of the reception data whether the telephone circuit or fax apparatus, so that the user can select the sender of the reception data.

In the communication apparatus described in the fourth embodiment and fifth embodiment, instead of the calling tone detecting circuit for judging the calling tone issued by the fax apparatus, fax apparatus call signal judging means for judging the call signal issued by the fax apparatus may be used, and when the user transmits fax data from the fax apparatus to the fax modem, transmission of call signal from the fax apparatus is confirmed by the microcomputer by the fax apparatus call signal judging means, so that it may be controlled so as to receive the analog modulated fax data transmitted by the fax apparatus.

Embodiment 6

A sixth embodiment of communication apparatus of the invention is described below while referring to FIG. 11 which is partly modified in the display format.

Figure 11:
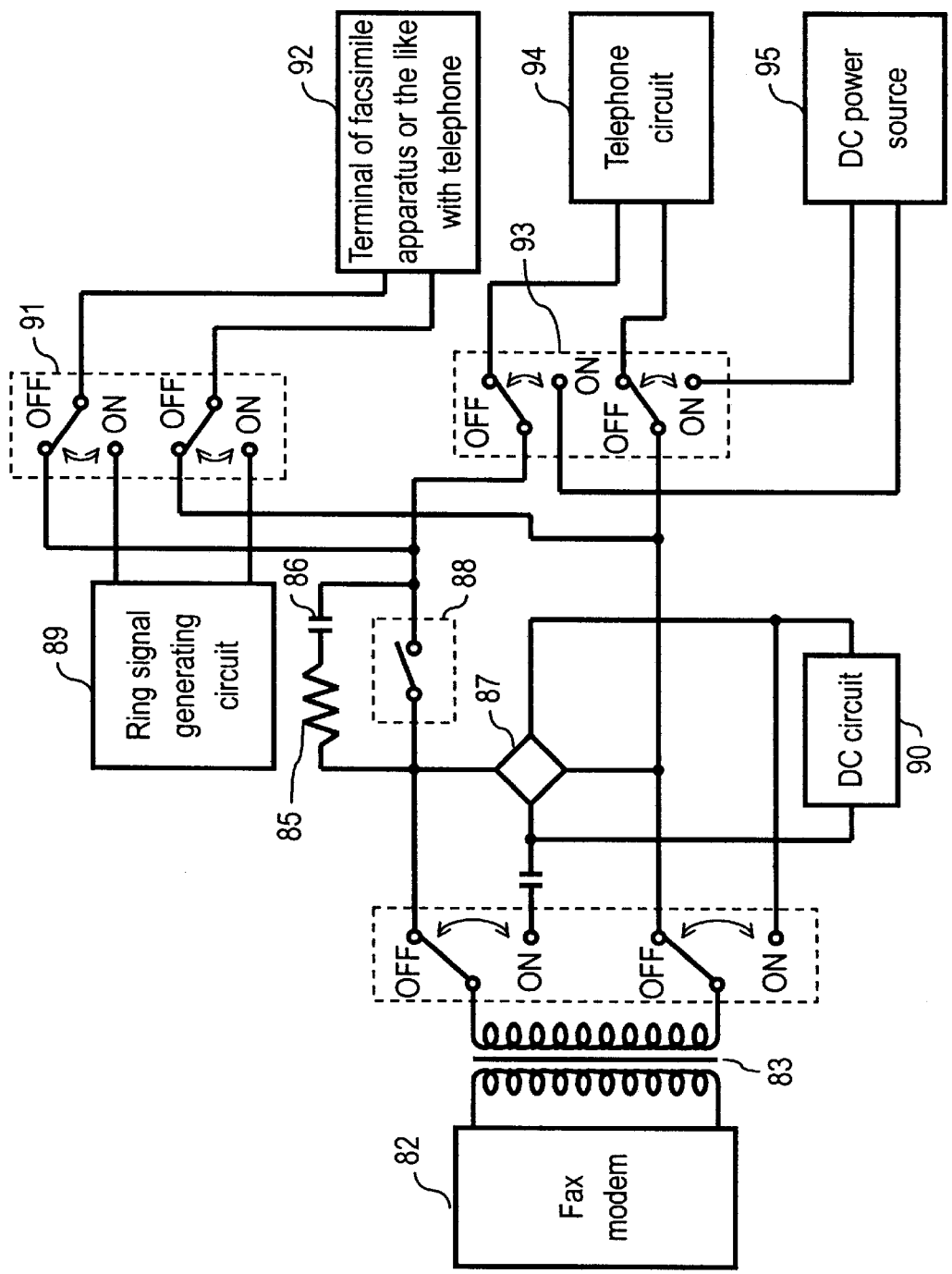
FIG. 11 is a block diagram showing a constitution of an NCU circuit in a sixth embodiment of the invention.
Figure 12:
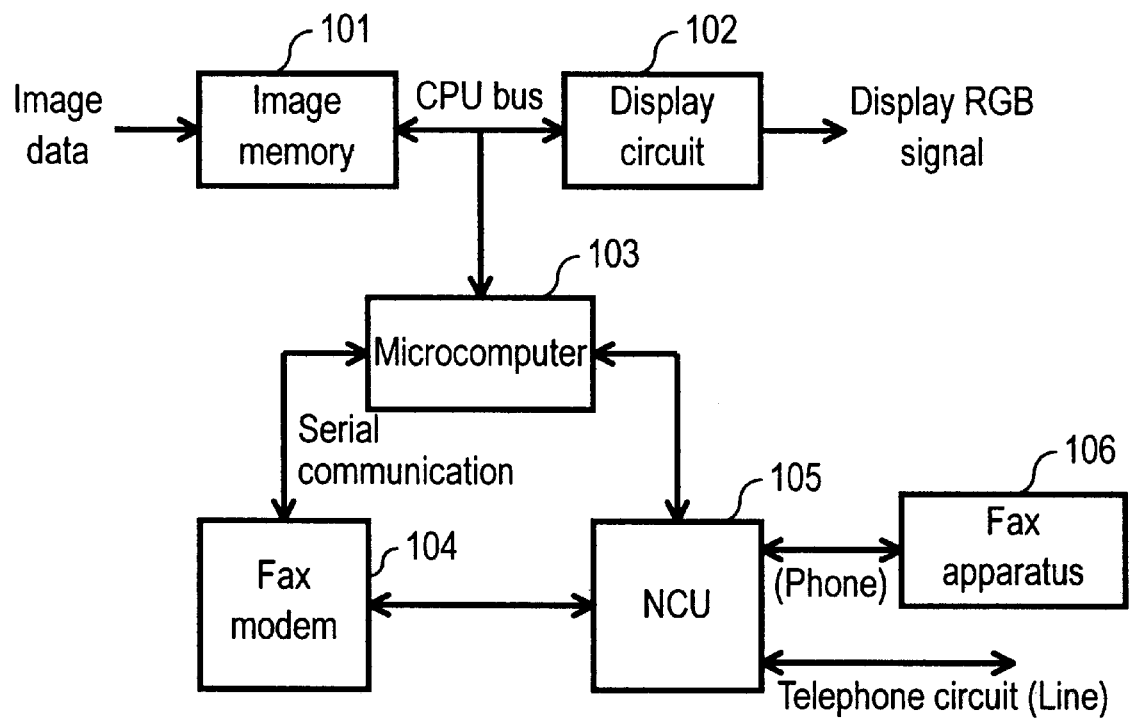
FIG. 12 is a block diagram showing a constitution of a conventional communication apparatus.
Figure 13:
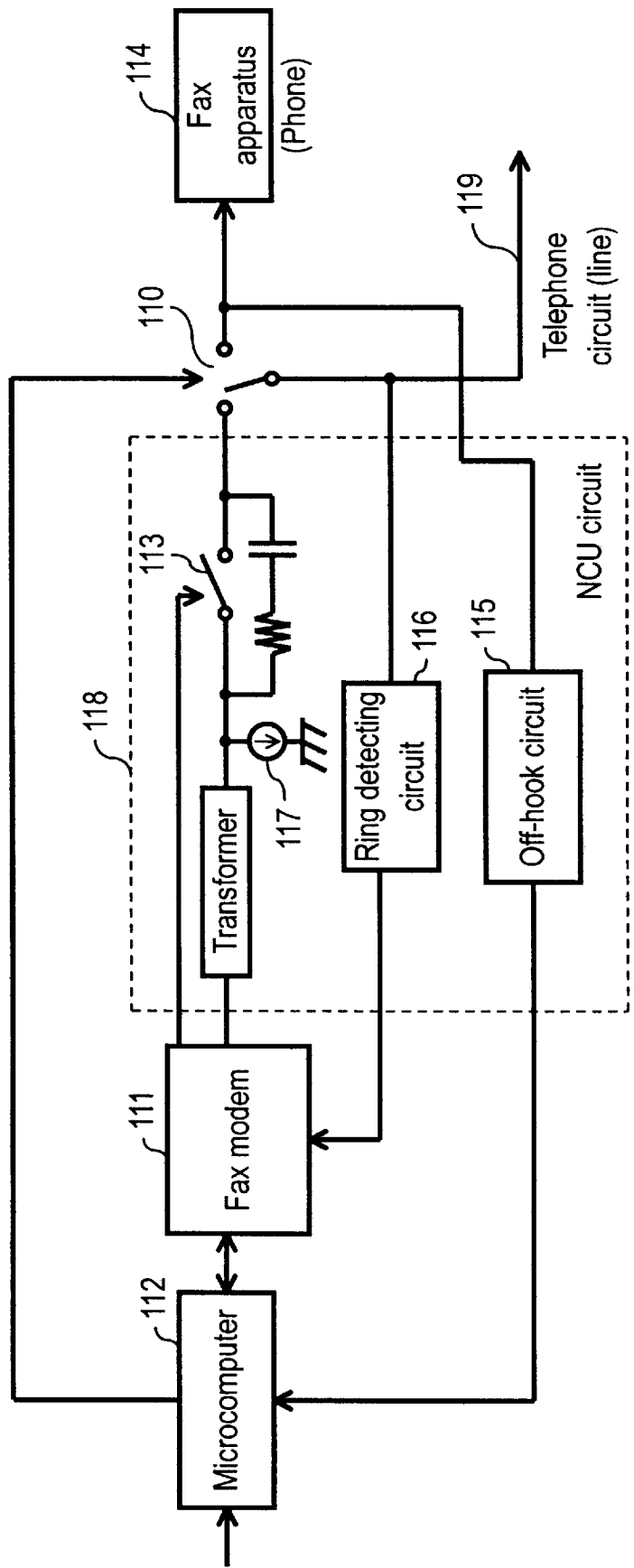
FIG. 13 is a block diagram showing a constitution of an NCU circuit in a conventional communication apparatus.

FIG. 11 shows an embodiment of communication apparatus according to the invention, and in FIG. 11, reference numeral 82 is a fax modem, which functions to modulate and demodulate digital data to and from analog signal for transmission through public telephone circuit, and recently its principal circuit is being integrated as IC. Reference numeral 94 is a general public telephone circuit connected to the modem, and it exchanges data together with the fax modem 82. Reference numeral 83 is a insulating transformer, which is same as the constituent element indicated as transformer without reference numeral in FIG. 4, etc., and it has a function of transforming the difference between the voltage level at the fax modem 82 side and the voltage level at the telephone circuit 94 side. A resistance 85 has a function for adjusting the signal level, and a capacitor 86 has a function for cutting off the DC signal. A first relay 93 has a function of selecting whether the telephone circuit 95 or DC power source 95 (equivalent to DC feed circuit in FIG. 4, etc.) for connecting to terminal 92 of facsimile apparatus with telephone or fax modem 82, a second relay 88 has a function of controlling the connection between the fax modem 82 and telephone circuit 94, a third relay 84 has a function of controlling whether or not to skip a diode bridge 87 (omitted in FIG. 4, etc.) and DC circuit 90 provided for forming a DC loop, and a fourth relay 91 has a function for controlling whether or not to transmit the ring signal produced in a ring signal generating circuit 89 (corresponding to call signal generating circuit in FIG. 4, etc.) to the terminal 92 of the facsimile apparatus with telephone. The ring signal generating circuit 89 has a function of generating a signal similar to the ring signal transmitted through an ordinary public telephone circuit, and the ring signal generated herein is transmitted to the telephone. That is, the ring signal can be transmitted from the fax modem 82 to the terminal 92 of the facsimile apparatus with telephone, or call is enabled.

In thus constituted embodiment, the operation is described below. When transmitting between the telephone circuit 94 and fax modem 82, the first relay 93 is OFF (in FIG. 11, the upper side, and in all the following relays, the upper side is OFF, and the lower side is ON), the second relay 88 is ON, the third relay 84 is OFF, and the fourth relay 91 is OFF. In this state, a DC loop is formed in the circuit, and the fax modem 82 is connected to the telephone circuit 94 through the insulating transformer 83, so that ordinary transmission is effected.

In the conventional constitution, when communicating between the terminal 92 of the facsimile apparatus with telephone and the fax modem 82, the first relay 93 is ON, the second relay 88 is OFF, the third relay 84 is OFF, and the fourth relay 91 is OFF. In this state, since DC voltage is not applied to the diode bridge 87, the diode is turned off, and the signal between the terminal 92 of the facsimile apparatus with telephone and the fax modem 82 is lowered in level, and secure communication is difficult. As the countermeasure, the second relay 88 should be turned on to conduct the diode bridge 87, but in such constitution, the DC source 95 must feed current into both the terminal 92 of the facsimile apparatus with telephone and the DC circuit 90, and the power source constitution must be large in capacity and expensive. In the embodiment, accordingly, the third relay 84 is provided, and by turning it on, a bypass is formed between the diode bridge 87 and DC circuit 90, thereby realizing communication between the terminal 92 of the facsimile apparatus with telephone and the fax modem 82.

Further according to the embodiment, when the terminal 92 of the facsimile apparatus with telephone communicates with other terminal through the telephone circuit 94, if monitoring of the circuit signal is necessary, by turning off the second relay 88 and turning on the third relay 84 same as above, if the second relay 88 is in OFF state, the state of the opposite side can be monitored in terms of AC by the CNG signal of facsimile or DTMF signal of telephone set through the series circuit of resistance 84 and capacitor 86. Moreover, owing to the bypass between the diode bridge 87 and DC circuit 90, the circuit signal can be monitored without voltage drop due to diode.

Thus, according to the embodiment, having such constitution, it is not necessary to install an additional monitor device outside, and the telephone circuit and telephone set can be monitored in a simple circuit constitution.

In this communication apparatus, moreover, same as in the foregoing embodiments, the fax apparatus can be directly connected to the fax modem without connecting through the terminal for connection of telephone circuit, and the data can be transmitted and received without connecting the fax apparatus to the terminal for telephone circuit.

That is, by using four relays, if an off-hook relay of them is in OFF state, the state of the opposite side can be monitored in terms of AC by the CNG signal of the facsimile or DTMF signal of the telephone set through the series circuit of resistance and capacitor. As a result, without using monitor display, it is advantageous that the telephone circuit and telephone set can be monitored in a simple circuit constitution.

What is claimed is:

1. A communication apparatus comprising:

modulating means for modulating digital data of fax format into analog signal and transmitting, a fax apparatus for receiving a signal from said modulating means without resort to telephone circuit, DC feed means for feeding direct current to said fax apparatus, call signal generating means for generating and sending out a call signal to said fax apparatus, first changeover means for selecting whether the telephone circuit or said DC feed means to be connected to said fax apparatus or said demodulating means, second changeover means for controlling the connection of said modulating means and telephone circuit, a circuit having a series of capacitor and resistance connected parallel to said second changeover means, third changeover means for controlling whether or not to skip a direct-current loop forming circuit, and fourth changeover means for controlling the call signal transmitted to said fax apparatus by said call signal generating means.

2. A communication apparatus comprising:

a first relay for selecting whether a telephone circuit or a direct-current power source to be connected to a fax apparatus or modem, a second relay for controlling connection between modem and telephone circuit, a circuit having a series of capacitor and resistance connected parallel to said second relay, a third relay for controlling whether or not to skip a direct-current loop forming circuit, and a fourth relay for controlling the ring signal transmitted to the fax apparatus.

3. A communication apparatus comprising:

modulating means for modulating and transmitting digital data of facsimile format into an analog signal;

a facsimile apparatus for receiving a signal from said modulating means without connecting through a telephone circuit;

off-hook detecting means for judging whether said facsimile apparatus is in an off-hook state or not;

changeover means for changing over and connecting said modulating means to the telephone circuit or to a DC circuit means for supplying direct current;

off-hook means for hooking off said telephone circuit;

bypassing means connected in parallel to said off-hook means for providing AC coupling between said facsimile apparatus and said modulating means;

ring detecting means connected to said telephone circuit for judging a call signal from said telephone circuit; and calling tone detecting means for detecting a calling tone signal from said facsimile apparatus.

4. A communication apparatus comprising:

modulating means for modulating and transmitting digital data of facsimile format into an analog signal;

a facsimile apparatus for receiving a signal from said modulating means without connecting through a telephone circuit;

first off-hook detecting means connected to said modulating means for judging whether said facsimile apparatus is in an off-hook state or not;

call signal generating means for generating and sending out a call signal to said facsimile apparatus;

second off-hook detecting means connected to said call signal generating means for judging whether said facsimile apparatus is in an off-hook state or not;

first changeover means for coupling the output from said call signal generating means or the output from said modulating means to said facsimile apparatus;

second changeover means for coupling said modulating means to the telephone circuit or to a DC current means for supplying direct current;

off-hook means for hooking off said telephone circuit;

bypassing means connected in parallel to said off-hook means for providing AC coupling between said facsimile apparatus and said modulating means;

ring detecting means connected to said telephone circuit for judging the call signal from said telephone circuit; and demodulating means for demodulating the analog signal received from said telephone circuit to facsimile data.

5. A communication apparatus comprising:

modulating means for modulating and transmitting digital data of facsimile format into an analog signal;

a facsimile apparatus for receiving a signal from said modulating means without connecting through a telephone circuit;

first off-hook detecting means connected to said modulating means for judging whether said facsimile apparatus is in an off-hook state or not;

call signal generating means for generating and sending out a call signal to said facsimile apparatus;

second off-hook detecting means connected to said call signal generating means for judging whether said facsimile apparatus is in an off-hook state or not;

first changeover means for coupling the output from said call signal generating means or the output from said modulating means to said facsimile apparatus;

second changeover means for coupling said modulating means to the telephone circuit or to a DC current means for supplying direct current;

off-hook means for hooking off said telephone circuit;

bypassing means connected in parallel to said off-hook means for providing AC coupling between said facsimile apparatus and said modulating means;

ring detecting means connected to said telephone circuit for judging the call signal from said telephone circuit;

demodulating means for demodulating the analog signal received from said telephone circuit to facsimile data; and calling tone detecting means for detecting a calling tone signal from said facsimile apparatus.

* * * * *